(12) United States Patent
Harwood et al.

(10) Patent No.: US 8,170,213 B1
(45) Date of Patent: May 1, 2012

(54) METHODOLOGY FOR COORDINATING CENTRALIZED KEY MANAGEMENT AND ENCRYPTION KEYS CACHED THROUGH PROXIED ELEMENTS

(75) Inventors: Jack Harwood, Paxton, MA (US); Thomas E. Linnell, Northborough, MA (US); John T. Fitzgerald, Mansfield, MA (US)

(73) Assignee: EMC Corporation, Hopkinton, MA (US)

( * ) Notice: Subject to any disclaimer, the term of this patent is extended or adjusted under 35 U.S.C. 154(b) by 1114 days.

(21) Appl. No.: 11/965,253

(22) Filed: Dec. 27, 2007

(51) Int. Cl.
*H04L 9/00* (2006.01)

(52) U.S. Cl. ......................................... 380/277; 711/100

(58) Field of Classification Search .............. 380/1, 202, 380/228, 277–279; 713/171; 711/3, 100, 711/113, 128, 164, 205, 221
See application file for complete search history.

(56) References Cited

U.S. PATENT DOCUMENTS

| | | | |
|---|---|---|---|
| 6,178,505 B1 | 1/2001 | Schneider et al. | |
| 6,785,728 B1 | 8/2004 | Schneider et al. | |
| 6,842,810 B1 | 1/2005 | Fitzgerald et al. | |
| 6,950,939 B2 * | 9/2005 | Tobin | 713/182 |
| 6,971,016 B1 | 11/2005 | Barnett | |
| 7,055,027 B1 | 5/2006 | Gunter et al. | |
| 7,110,982 B2 | 9/2006 | Feldman et al. | |
| 7,165,152 B2 | 1/2007 | Blumenau et al. | |
| 7,234,063 B1 | 6/2007 | Baugher et al. | |
| 7,246,233 B2 | 7/2007 | Brabson et al. | |
| 7,260,636 B2 | 8/2007 | Blumenau et al. | |
| 7,272,625 B1 | 9/2007 | Hannel et al. | |
| 7,310,821 B2 | 12/2007 | Lee et al. | |
| 7,353,388 B1 | 4/2008 | Gilman et al. | |
| 7,401,224 B2 * | 7/2008 | Gantman et al. | 713/170 |
| 7,506,002 B2 * | 3/2009 | Herbst et al. | 1/1 |
| 7,624,126 B2 * | 11/2009 | Pizzo et al. | 1/1 |
| RE41,186 E * | 3/2010 | Pensak et al. | 713/171 |
| 7,783,882 B2 * | 8/2010 | Dawson et al. | 713/165 |

OTHER PUBLICATIONS

U.S. Appl. No. 11/965,250, filed Dec. 27, 2007.
U.S. Appl. No. 11/964,789, filed Dec. 27, 2007.
U.S. Appl. No. 11/965,244, filed Dec. 27, 2007.

\* cited by examiner

*Primary Examiner* — Kim Vu
*Assistant Examiner* — Leynna Truvan
(74) *Attorney, Agent, or Firm* — BainwoodHuang (57) ABSTRACT

A method is provided for effectively managing encryption keys. A storage processor requests a key associated with a particular object ID associated with a particular device address range from a key server. The key server provides a unique key associated with the object ID. Old keys may be deleted either upon a determination by the storage processor that the key is no longer needed, or upon a signal from the key server indicating that the key is to be deleted. In either case, the storage processor deletes the key from all locations in memory and sends a confirmation signal to the key server. The key server then lists the key as disabled for possible future re-use. Embodiments are also directed to apparatus for use in practicing the method.

10 Claims, 5 Drawing Sheets

METHODOLOGY FOR COORDINATING CENTRALIZED KEY MANAGEMENT AND ENCRYPTION KEYS CACHED THROUGH PROXIED ELEMENTS

BACKGROUND

An encryption key is a software-based construct that controls transformation (i.e., encryption of data) between readable form and secure, non-readable form. One use of an encryption key is to encrypt data within a file prior to storing that file onto a disk drive. For example, a user may password encrypt the file so that only someone who knows the password may successfully read and decrypt the file from disk.

Another use of an encryption key is to encrypt a data transmission that passes over public network. For example, the Secure Sockets Layer (SSL) and Transport Layer Security (TLS) protocols allow for encrypted data transmissions across the Internet for applications such as online banking Another use of an encryption key is in an authentication device such as a token which allows users to login or authenticate themselves to a particular server. Here, a key server stores/updates key assignments to users.

SUMMARY

Unfortunately, there are deficiencies to the above-described conventional applications of encryption keys. In the first case, the user must remember password linked to encryption key, which limits the usefulness of the application. In the second case, the security stops at the receiving location. It would be preferred for the data to remain protected even once written to disk. In the third case, authentication simply gives front door access to a server.

In the context of a data storage system, it would be advantageous to associate keys with storage objects (e.g., physical devices, LUNs, hypervolumes, etc.). However, there needs to be smart key management to effectively implement this approach without wasting keys.

Unfortunately, the above-described data storage systems do not effectively manage the encryption keys. In contrast, embodiments are provided for effectively managing encryption keys. A storage processor requests a key associated with a particular object ID associated with a particular device address range from a key server. The key server provides a unique key associated with the object ID. Old keys may be deleted either upon a determination by the storage processor that the key is no longer needed, or upon a signal from the key server indicating that the key is to be deleted. In either case, the storage processor deletes the key from all locations in memory and sends a confirmation signal to the key server. The key server then lists the key as disabled for possible future re-use. Embodiments are also directed to apparatus for use in practicing the method.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
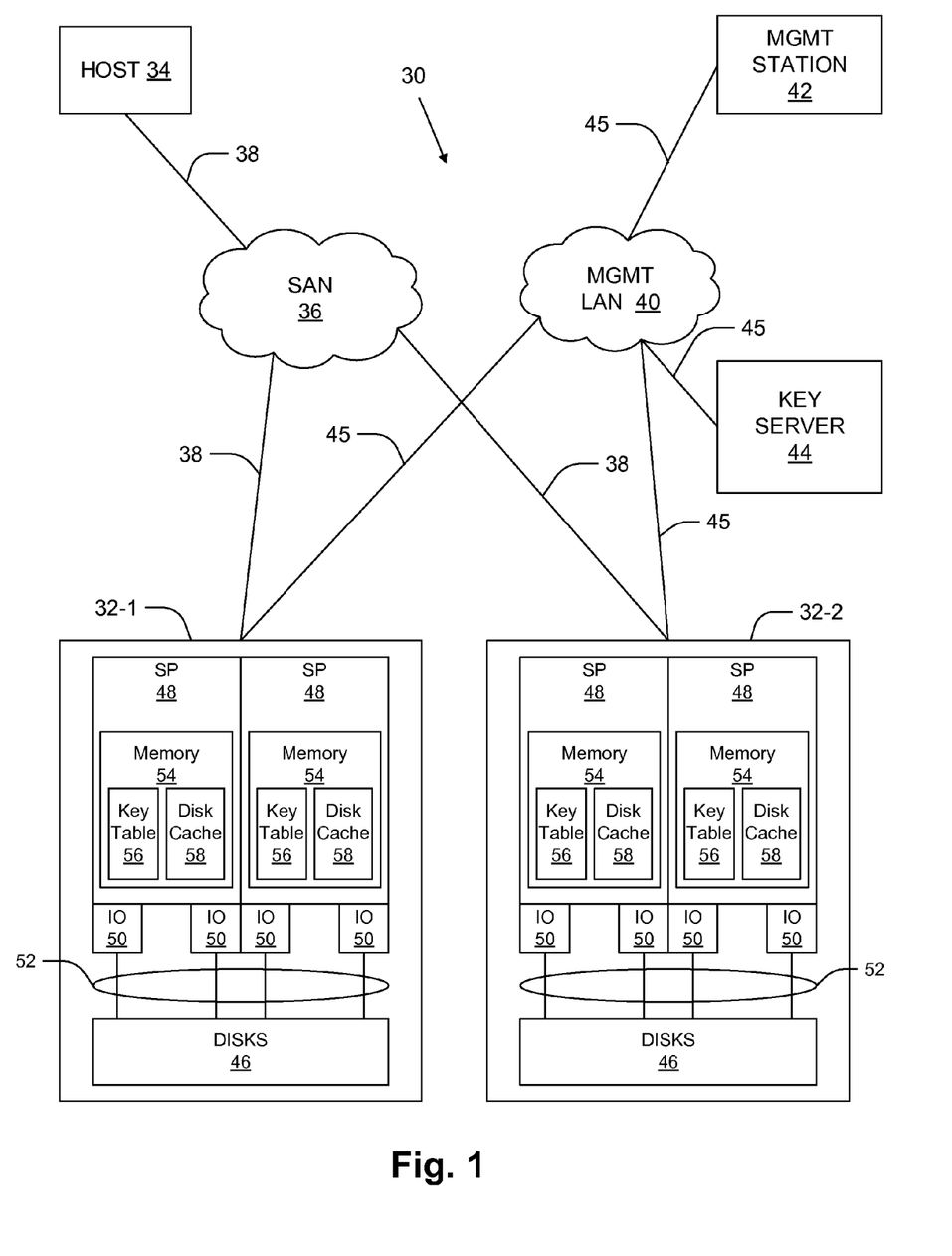
FIG. 1 illustrates an example system for use in practicing one embodiment.

FIG. 1 shows a computer system 30 including data storage systems 32 (shown as 32-1 and 32-2) connected to one or more host computers (HOST) 34 by a storage-area network (SAN) 36. The SAN 36 employs high-bandwidth communications links 38 specifically tailored for data storage communications, such as Fibre Channel. The data storage systems 32 are also connected via a management local-area network (MGMT LAN) 40 to a storage management station (MGMT STATION) 42 and a key server 44. The management LAN 40 generally employs lower-bandwidth links 45 such as 10/100 Mbps Ethernet links, sufficient to carry communications among the management station 42, key server 44, and data storage systems 32 relating to configuration and operational monitoring and control of the data storage systems 32.

As shown, the data storage systems 32 each contain a plurality of data storage devices shown as disks 46, accessed by one or more storage processors (SPs) 48 via respective input/output (I/O) modules 50. The connections 52 between the I/O modules 50 and the disks 46 are also storage-oriented connections, such as Fibre Channel or Small Computer Systems Interconnect (SCSI) links, for example. The connections between the SPs 48 and the I/O modules 50 are typically high-speed circuit board connections, such as low-voltage differential signaling (LVDS). The I/O modules 50 include specialized interface circuitry (not shown) for carrying out high-speed data transfer, and also a processor (also not shown) for performing higher-level functions, such as functions described below. The SPs 48 also perform higher-level storage-related functions, including for example redundant array of inexpensive disks (RAID) functions. Beyond RAID, the data storage systems 32 may implement other forms of redundancy to enhance availability as generally known in the art.

As described in more detail below, the data storage systems 32 implement encrypted data storage for purposes of enhanced data security. The host(s) 34 and SAN 36 operate on so-called "plaintext" or unencrypted data which is directly usable by application programs (such as an operating system) executing on the host(s) 34. However, within the data storage systems 32, data is stored in encrypted form on the disks 46, and thus the storage systems 32 perform data encryption and decryption to translate between the plaintext data of the host(s) 34 and SAN 36 and the encrypted data stored on the disks 46. Any of various encryption/decryption processes may be employed, including the various modes of the Advanced Encryption Standard (AES), and using keys of various sizes. The SPs 48 contain memory 54. The memory 54 contains a key table 56 storing encrypted data encryption keys 58 for encrypting data to be stored on disks 46. The memory 54 also contains a disk cache 58 for caching data to be stored on disks 46 as well as data read from disks 46.

It should be noted that the arrangement of FIG. 1 may represent a physical partitioning into different physical enclosures, but in alternative embodiments some functions may be physically co-located with others. As an example, in one embodiment the SPs 48 and I/O modules 50 may reside in the same physical enclosure. In another embodiment, the SPs 48 and I/O modules 50 may reside in separate enclosures. As a further example, in one embodiment, the I/O modules 50 may be implemented on the same circuit board as an SP 48, while in another embodiment, the I/O modules 50 and the SPs 48 may be implemented on separate circuit boards within the same enclosure. In another embodiment the encryption endpoints are not located within the I/O modules 50 at all, but rather in a separate card or on disk drives or disk drive enclosures.

Figure 2:
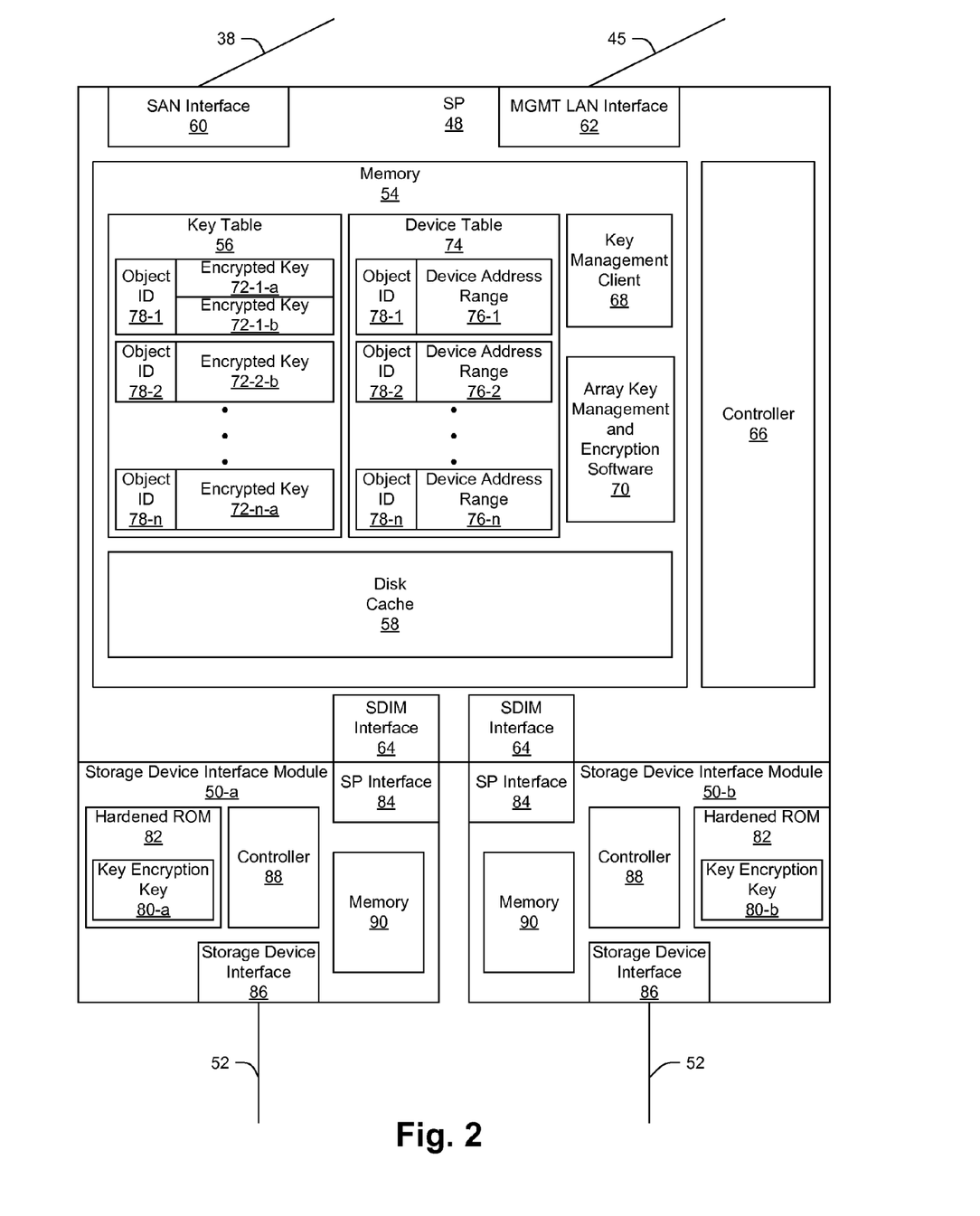
FIG. 2 illustrates an example apparatus of one embodiment.

FIG. 2 depicts an SP 48 and I/O modules 50 of one embodiment in more detail. SP 48 includes a SAN interface 60 for interfacing with SAN 36 and a management LAN interface 62 for interfacing with management LAN 40. In some embodiments, as depicted, SP 48 interfaces with one or more Storage Device Interface Modules (SDIMs) 50 (also known as an I/O module 50) across SDIM interface 64. In another embodiment, not depicted, the SDIM 50 is integrated within the SP 48 itself. SP 48 also includes a controller 66 for executing programs stored in memory 54. One such program is the key management client 68. Another such program is the array key management and encryption software 70. These programs manage the creation, storage, and use of data encryption keys 72 for encrypting data to be stored to disk 46.

As previously mentioned, memory 54 stores a key table 56 and a disk cache 58. Memory 54 also stores device table 74. The data storage area of disks 46 may be broken into several portions, each having a distinct encryption key 72, as described in further detail below. Each portion having a distinct encryption key is defined by a device address range 76, and is associated with a distinct object ID 78. The device table 74 stores a mapping between the device address ranges 76 and the object IDs 78. The key table stores a mapping between the object IDs 78 and the encryption keys 72 used to encrypt data stored within the device address range 76 associated with the object ID 78. However, for additional data security, the encryption keys 72 are stored within the key table 56 in encrypted form. Each entry in the key table 56 may include one or more encrypted encryption keys 72. For example, Object ID 78-1 is associated with encryption key 72-1, but encryption key 72-1 is stored in the entry twice, once each encrypted with a different key encryption key 80. Thus encrypted key 72-1-*a* is encrypted with key encryption key 80-*a*, and encrypted key 72-1-*b* is encrypted with key encryption key 80-*b*. Some entries in the key table may only contain a single encrypted version of the encryption key 72. Thus, for example, object ID 78-2 is associated with encryption key 72-2, which is encrypted only with key encryption key 80-*b*, while object ID 78-*n* is associated with encryption key 72-*n*, which is encrypted only with key encryption key 80-*a*. In some embodiments, the key table 56 stores the device address ranges 76, eliminating the need for a separate device table 74.

Each SDIM 50 includes a hardened Read-only-memory (ROM) 82 or, in another embodiment (not pictured) a hardened non-volatile flash memory location, to store a key encryption key 80. Thus, SDIM 50-*a* stores key encryption key 80-*a* in its hardened ROM 82, while SDIM 50-*b* stores key encryption key 80-*b* in its hardened ROM 82. A hardened ROM is a hardware circuit (or set of circuits) capable of storing a piece of data (in this case a key, for example a 512-bit key), such that the circuit is protected from outside probing, such as by being surrounded by a plastic lamination. If an intruder were to gain access to the inside of a SDIM 50 and attempt to electrically probe the hardened ROM 82 in order to discover the value of the key encryption key 80 stored therein, he would not be able to maintain an electrical connection with the hardened ROM 82 to be able to do so. If the intruder were to attempt to pierce the lamination, doing so would likely destroy the hardened ROM 82, thereby rendering the key encryption key 80 stored therein destroyed, and the intruder would not be able to read it. In another embodiment, the hardened memory location may be a register that is not readable external to the encryption endpoint.

Each SDIM 50 also includes an SP interface 84 for interfacing with the SDIM interface 64 of the attached SP 48, a storage device interface 86 for interfacing with the disks 46, a controller 88, and a (volatile) memory 90. In normal operation, the controller 88 is configured to receive data from the SP 48 to be written to disks 46 according to storage instructions. Controller 88 determines exactly where on disk the data is to be written, and with reference to the device table 74 and the key table 56, controller 88 encrypts the data and writes it to the appropriate place on disk. In some embodiments, controller 88 stores key table and device table entries in a cache in memory 90, so that it need not communicate with the SP for every encryption operation that it performs. For additional security, in some arrangements, the encryption keys 72 within the cached entries may be stored in encrypted form, and are only decrypted on the fly as needed to encrypt and decrypt data on the disks 46. However, in other arrangements, encryption keys 72 are stored in plaintext format within memory 90. Controller 88 is only able to decrypt encryption keys 72 which are encrypted with the particular key encryption key 80 that it stores in its hardened ROM 82. Thus, for example, all data stored on disk 46 within device address range 76-2 must be read and written through SDIM 50-*b*, because encryption key 72-2 is only stored encrypted with key encryption key 80-*b*, and not with key encryption key 80-*a*. However, all data stored on disk 46 within device address range 76-1 may be read and written through either SDIM 50-*a* or SDIM 50-*b*, because encryption key 72-1 is stored encrypted both with key encryption key 80-*a* and key encryption key 80-*b*.

Key management client 68 runs on SP 48. It interfaces with key server 44 to request and receive a key 72 for an object ID 78 that is in need of key 72 (either because the object ID 78 was newly created or because the old key 72 is about to expire). Key management client 68 also interfaces with key server 44 to manage the deletion of old or expired keys. Array key management and encryption software 70 also runs on SP 48. It assigns and manages object IDs 78 to particular device address ranges 76. It also assigns particular SDIMs 50 to be responsible for data associated with particular object IDs 78, allowing the SDIM 50 to request, through the key management client 68, a key 72 for that object ID 78 encrypted with its own key encryption key 80 from key server 44.

Figure 3:
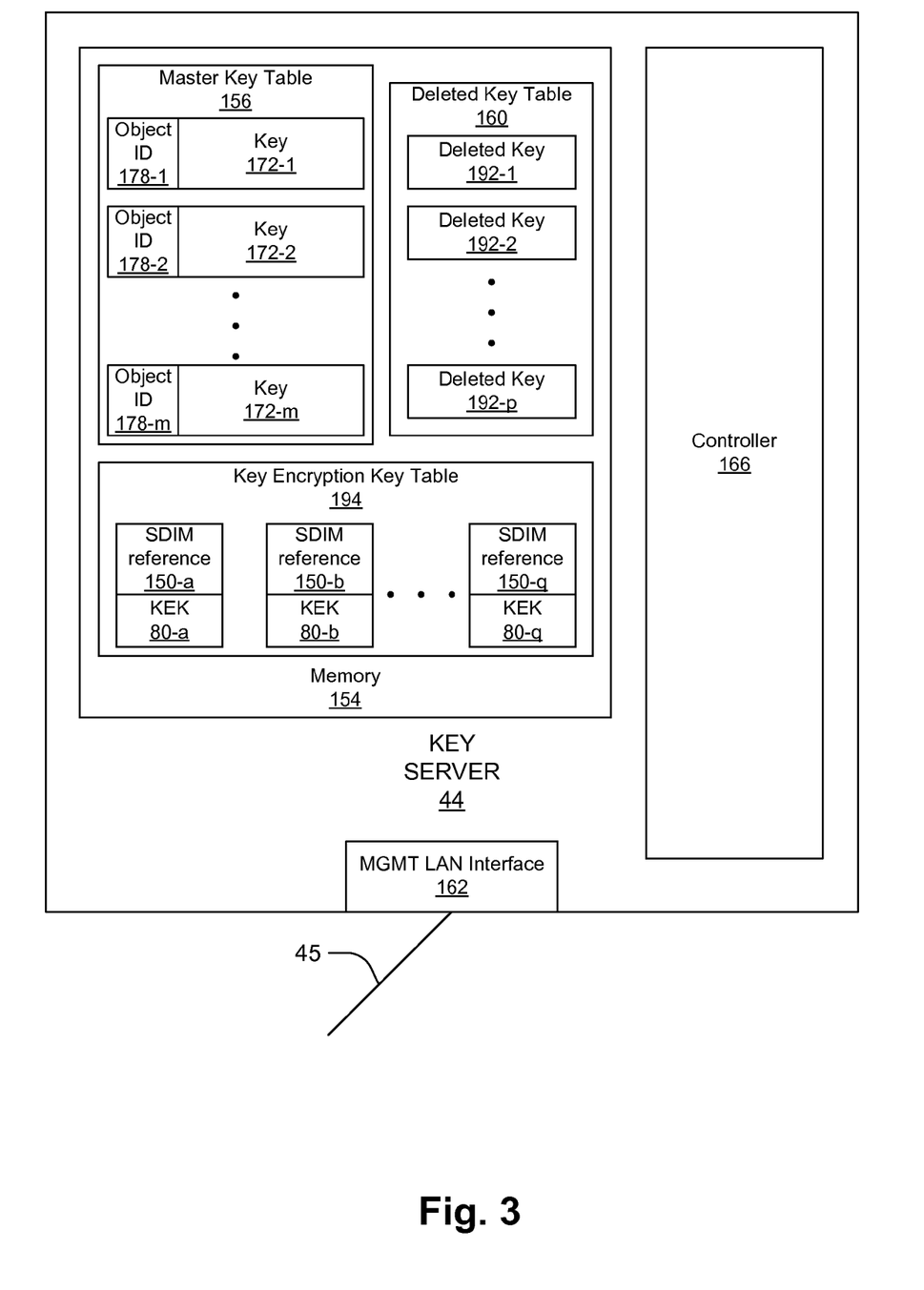
FIG. 3 illustrates an example apparatus of one embodiment.

FIG. 3 depicts a key server 44 of one embodiment in more detail. Key server 44 includes a MGMT LAN interface 162 for connecting to MGMT LAN 40, a controller 166, and memory 154. Memory 154 stores a master key table 156 for keeping track of associations between object IDs 178 and encryption keys 172. Memory 154 also stores a deleted key table 160 for storing a list of disabled keys 192. Memory 154 also stores a key encryption key table 194 for storing associations between references 150 to particular SDIMs 50 and the KEK used by the respective SDIM 50.

Figure 4:
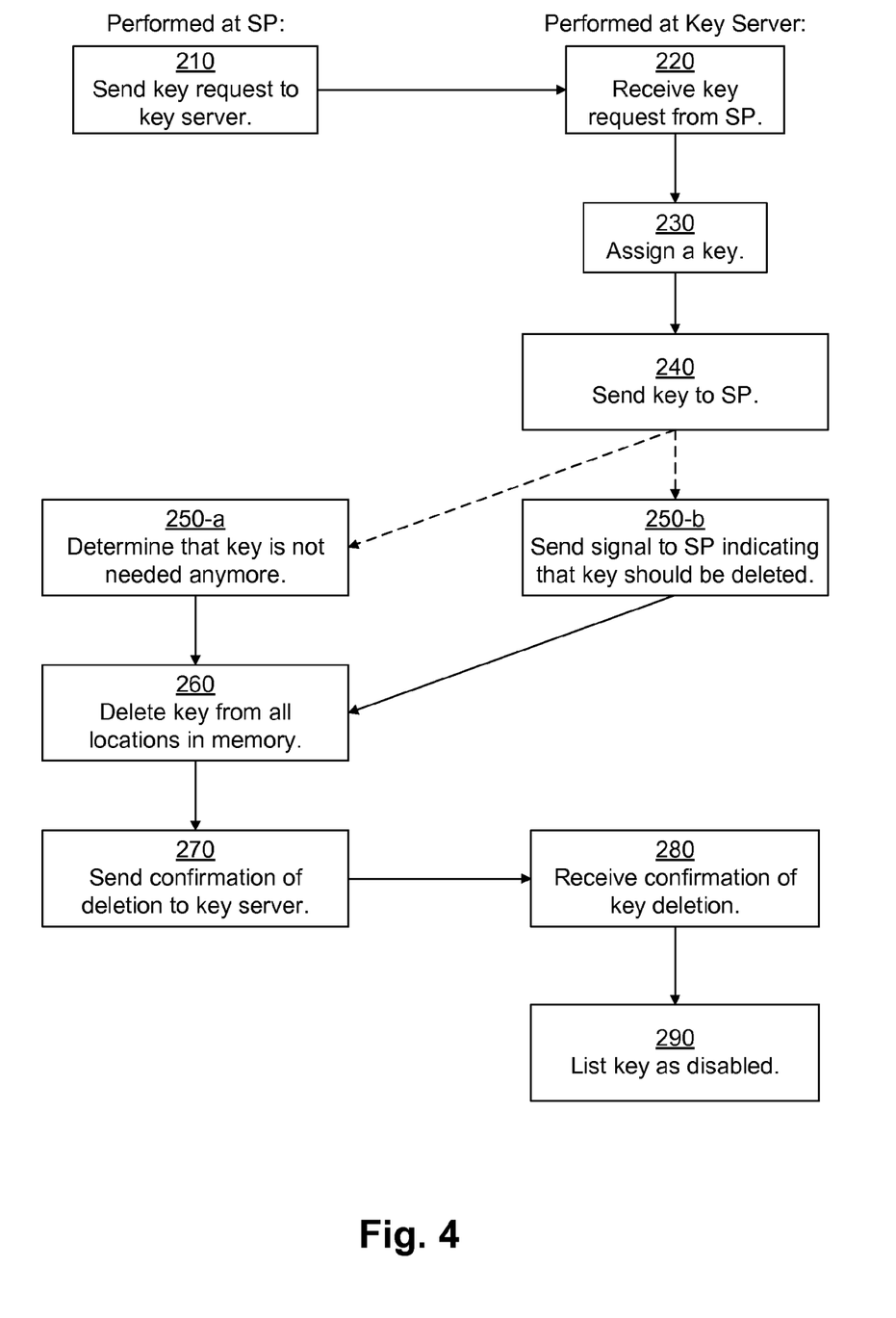
FIG. 4 illustrates an example method of one embodiment.

FIG. 4 depicts method 200 of one embodiment. In step 210, SP 48 sends a request for a key 72 to key server 44. Array key management and encryption software 70 assigns an object ID 78 to each device address range 76 that needs a separate encryption key 72. Array key management and encryption software 70 stores this association in device table 74, or in some cases in key table 56. Key management client 68 uses the object IDs 78 and the device address ranges 76 to send key requests to the key server 44. Thus, key management client 68 sends a request to the key server 44 including the object ID 78 and the device address range 76. Key management client 68 also includes, in some embodiments, a reference 150 to the identity of the SDIM 50 that will be using the key 72.

In step 220, key server 44 receives the key request from SP 48. In step 230, key server 44 assigns a key 172. Key server 44, assigns a unique key 172 to the received object ID 178 (if a key 172 has not already been assigned). Key server 44 stores the object ID 178 and key 172 in master key table 156. In some embodiments, key server 44 also stores the device address range 76 in the master key table 156. However, the key server 44 generally does not make use of the device address range 76. It may be used to reconstruct a device table 74 in the event that the device table 74 of an SP 48 is deleted or becomes corrupted in memory 54.

In step 240, key server 44 sends the key 172 to the SP 48. Key server 44 sends the key 172 back to the key management client 68 at the SP 48. In some embodiments, the key server 44 first encrypts the key 172 with the appropriate key encryption key 80 for the intended SDIM 50, as determined with reference to key encryption key table 194.

Once the key 172/72 has been assigned and stored in the SP, normal operation of the data storage system 32 proceeds, with the keys 72 being used to encrypt and decrypt data storage operations. However, at some point, a key 72 will need to be retired. This may happen for various reasons. In one case, a key 72 will expire (since each key 172 is assigned an expiration by the key server for security purposes). In another case, a new key 72 will replace an old key. In another case, an object ID 78 will be retired, thereby eliminating a need for the key 72.

In one case, as shown in step 250-a, the SP 48 will determine that a key 72 is not needed any longer. This may happen if the array key management and encryption software 70 deletes an object ID 78. It may also happen if the SP 48 determines that the key 72 is about to expire, in which case the key management client 68 would request a replacement key 72 from the key server, and once the replacement key 72 has been received, the controller 66 directs the SDIMs to decrypt all data stored in the associated device address range 76 and re-encrypt it with the replacement key 72. Once the data has all been re-written to disk 46 with the replacement key, the old key 72 is no longer needed.

In another case, as shown in step 250-b, the key server 44 may determine that a key 172 should be deleted. This may happen if the key 172 is about to expire (and the SP 48 has not requested a replacement key). That situation might arise when the key 172 was provided for temporary access to data, as might be done by a government agency to a government contractor. The key server 44 may also determine that a key 172 should be deleted when an administrator (operating at MGMT station 42) directs to key server 44 to delete the key 172. Once this determination is made, the key server 44 sends a signal to the SP 48 indicating that the key 172 should be deleted.

In either case, 250-a or 250-b, the next step is step 260, in which the SP 48 deletes the key 72 from all locations in memory 54, 90 where it had been stored. Thus, the array key management and encryption software 70 deletes the key from the key table 56 and directs the controller 88 of each SDIM 50 to delete any cached copies of the key stored in memory 90. In some embodiments, the entire cache stored in memory 90 is deleted, and must be completely refreshed. If multiple copies of the key 72 were stored in the key table 56, as for example would happen if the key 72 were stored encrypted with multiple KEKs 80, then each instance of the key 72 within the key table 56 would also be deleted.

In step 270, SP 48 sends a confirmation signal to key server 44 indicating that the key 72 has been deleted from memory 54, 90. In step 280, key server 44 receives the confirmation signal. In step 290, key server 44 lists the key 172 as disabled. If it has not already done so, key server 44 deletes the key 172 from the master key table 156. Key server then adds the key 172 which has been disabled to the deleted key table 160 as deleted key 192. In some embodiments, the deleted key table 160 may also maintain references to the object IDs 178 with which the deleted keys 192 were previously associated for fault-tolerant purposes. Periodically, a system administrator may decide to permanently delete the deleted keys 192 from the deleted key table 160.

Figure 5:
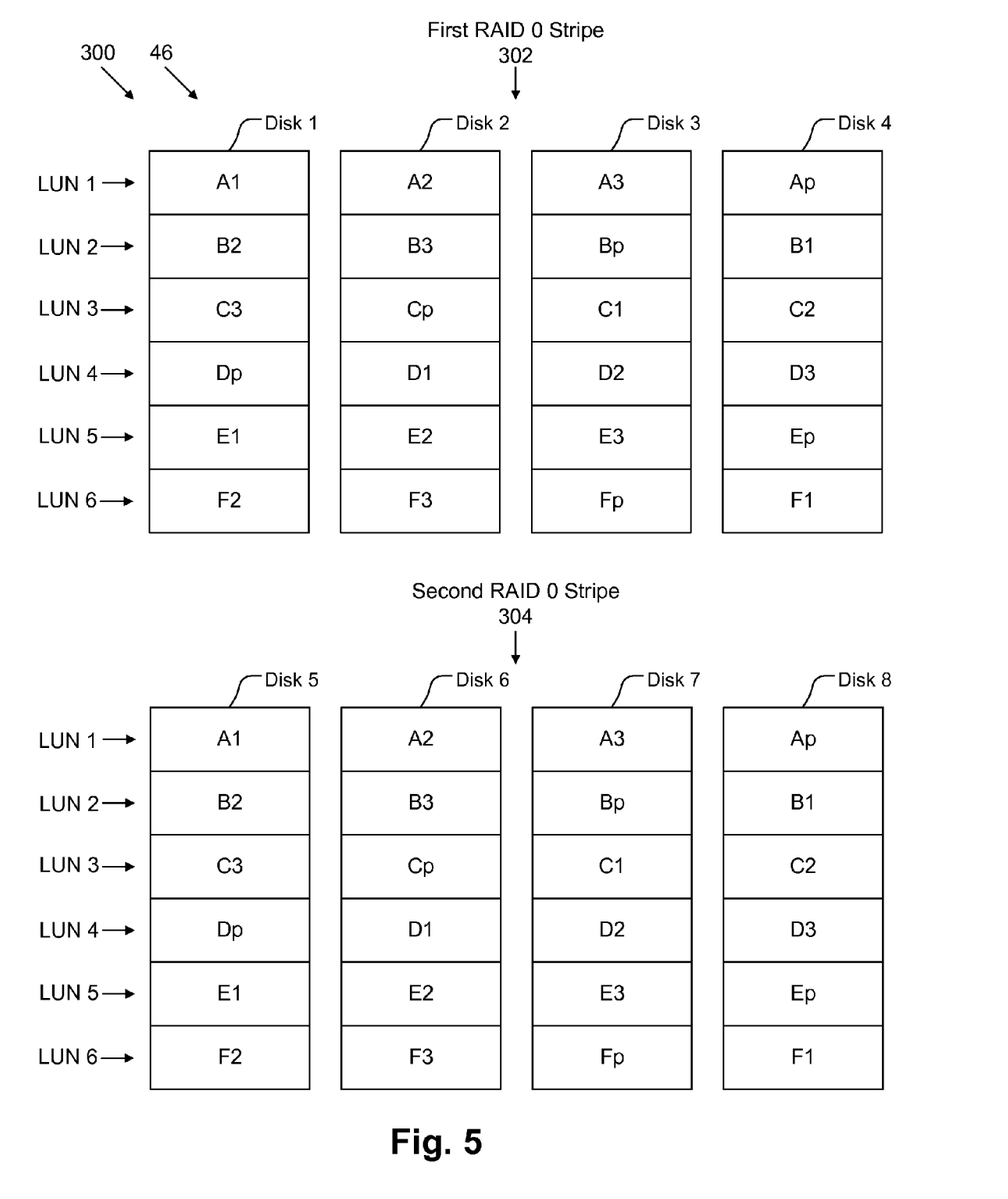
FIG. 5 illustrates an example storage layout for use in practicing one embodiment.

FIG. 5 shows an example configuration of the disks 46 of one embodiment. In this configuration 300, RAID 50 is employed. Thus First RAID 0 Stripe 302 is a RAID 5 group of four disks, Disks 1-4, while Second RAID 0 stripe 304 is a RAID 5 group of four disks, Disks 5-8. Second RAID 0 stripe 304 is a mirrored copy (using RAID 0) of First RAID 0 stripe 302. Each RAID 5 group of disks is split into several logical partitions LUNs 1-6. Each partition is striped across four disks (either disks 1-4 or disks 5-8), using three disks for data, and one disk for parity. Thus, LUN 1 in First RAID 0 stripe 302 has data A1, A2, A3 written to disks 1, 2, and 3, respectively, while parity data Ap is written to disk 4. Similarly, LUN 2 in First RAID 0 stripe 302 has data B1, B2, B3 written to disks 4, 1, and 2, respectively, while parity data Bp is written to disk 3.

In some embodiments, each disk, Disks 1-8, is an object 78, each disk having a distinct encryption key 72 (i.e., 8 encryption keys are used). In other embodiments, each disk within the First RAID 0 Stripe 302, Disks 1-4, is an object 78, each disk having a distinct encryption key 72, the Second RAID 0 stripe 304 being an exact bit-level copy of First RAID 0 stripe 302 (i.e., 4 encryption keys are used). In some embodiments, each partition, LUNs 1-6, on each RAID 0 stripe is an object 78, each partition having a distinct encryption key 72 (i.e., 12 encryption keys are used). In other embodiments, each partition, LUNs 1-6, within the First RAID 0 Stripe 302 is an object 78, each partition having a distinct encryption key 72, the Second RAID 0 stripe 304 being an exact bit-level copy of First RAID 0 stripe 302 (i.e., 6 encryption keys are used). In some embodiments, the portion of each partition, LUNs 1-6, on each disk, Disks 1-8, is an object 78, each partition on each disk having a distinct encryption key 72 (i.e., 48 encryption keys are used). Thus, for example, in such embodiments, data portions A1, A2, and B3 within First RAID 0 stripe 302 and data portions A1, A2, and B3 within Second RAID 0 stripe 304 are all encrypted with six distinct encryption keys 72. In other embodiments, the portion of each partition, LUNs 1-6, on each disk within the First RAID 0 Stripe 302, Disks 1-4, is an object 78, each partition on each disk having a distinct encryption key 72, the Second RAID 0 stripe 304 being an exact bit-level copy of First RAID 0 stripe 202 (i.e., 24 encryption keys are used). Thus, for example, in such embodiments, data portions A1, A2, and B3 within each RAID 0 Stripe 302, 304 are all encrypted with three distinct encryption keys 72.

Thus, a computer system 30 is shown for managing the encryption keys for encrypting data within a data storage system 32.

While various embodiments of the invention have been particularly shown and described, it will be understood by those skilled in the art that various changes in form and details may be made therein without departing from the spirit and scope of the invention as defined by the appended claims.

For example, while embodiments have been shown and described as using an 8-disk RAID 50 configuration for disks 46, other configurations may also be used. Thus, for example, RAID 0, 1, 2, 3, 4, or 5 may be used, using any number of disks allowed for such a RAID configuration. Other combined RAID levels, such as, for example, RAID 10, may also be used.

As an additional example, while embodiments have been shown and described as placing the encryption endpoint (i.e., the portion of the system that actually performs the encryption and decryption operations) in the SDIM 50, the encryption endpoint may also be placed elsewhere. Thus, the encryption endpoints could instead be placed within the individual disks 46.

What is claimed is:

1. A method comprising, at a storage processing device:
    sending a request to a key server to assign a key associated with a key identifier;
    receiving an assigned key from the key server;
    subsequently, deleting the assigned key from all locations where it had been stored in memory; and
    subsequently, sending a confirmation signal to the key server indicating that the assigned key has been deleted;
    wherein:
        the key identifier identifies a portion of data storage controlled by the storage processing device;
        the assigned key is used to encrypt data to be written to the portion of data storage and to decrypt data read from the portion of data storage;
        receiving the assigned key from the key server includes:
            receiving an encrypted assigned key from the key server; and
            storing the encrypted assigned key in memory within an entry of a key table, the entry of the key table being indexed by an object identifier, the object identifier also indexing into a device table, the device table storing an address range of the portion of data storage;
        the encrypted assigned key is associated with a first storage device interface module (SDIM) coupled to the storage processing device, the encrypted assigned key having been encrypted with a first key encryption key uniquely associated with the first SDIM, the encrypted assigned key being stored within a first sub-entry of the entry, the first sub-entry being indexed by a first SDIM identifier, the first SDIM identifier uniquely identifying the first SDIM;
        the method further comprises, at the storage processing device:
            receiving another encrypted assigned key from the key server, the other encrypted assigned key being associated with a second SDIM coupled to the storage processing device, the first SDIM being distinct from the second SDIM, the other encrypted assigned key having been encrypted with a second key encryption key uniquely associated with the second SDIM, the other encrypted assigned key being an encrypted version of the assigned key; and
            after receiving the other encrypted assigned key from the key server, storing the other encrypted assigned key in memory within a second sub-entry of the entry of the key table, the second sub-entry being indexed by a second SDIM identifier, the second SDIM identifier uniquely identifying the second SDIM;
        the first SDIM is configured to cryptographically write data received from a host to the portion of data storage using the assigned key; and
        the second SDIM is configured to cryptographically write data received from a host to the portion of data storage using the assigned key.

2. A method as in claim 1 wherein deleting the assigned key from all locations where it had been stored in memory includes:
    deleting all entries from the key table storing an association of keys and key identifiers, the entries to be deleted being those entries that include the assigned key; and
    deleting the assigned key from all cached copies of entries to be deleted from the key table.

3. A method as in claim 1 wherein the method further comprises:
    at the key server:
        receiving the request from the storage processing device to assign the key associated with the key identifier;
        assigning a unique key associated with the key identifier;
        sending the assigned key to the storage processing device; and
        upon receiving the confirmation signal from the storage processing device that the assigned key has been deleted, listing the assigned key as disabled.

4. A method as in claim 3 wherein:
    the method further comprises at the key server, subsequent to sending the assigned key to the storage processing device, sending a signal to the storage processing device indicating that the assigned key should be deleted; and
    deleting the assigned key from all locations where it had been stored in memory is performed in response to receiving the signal from the key server indicating that the assigned key should be deleted.

5. A method as in claim 3 wherein deleting the assigned key from all locations where it had been stored in memory is performed in response to the storage processing device determining that it no longer needs the assigned key.

6. A method as in claim 3 wherein sending the assigned key to the storage processing device includes:
    encrypting the assigned key; and
    sending the encrypted assigned key to the storage processing device.

7. A storage processing device comprising:
    a first network interface for connecting to a management network;
    a storage device interface for connecting to a storage array;
    memory, the memory storing a key table; and
    a controller, the controller being configured to:
        send a request over the first network interface to a key server to assign a key associated with a key identifier;
        receive, over the first network interface, an assigned key from the key server;
        store the key identifier and the assigned key in the key table;
        store the key identifier and the assigned key in a cache in the storage device interface;
        subsequently, delete the assigned key from the key table in memory and the cache in the storage device interface; and
        subsequently, send, over the first network, a confirmation signal to the key server indicating that the assigned key has been deleted
    wherein:
        the storage processing device further includes a second network interface for connecting to a storage area network;

the key identifier identifies a portion of data storage controlled by the storage processing device;
the controller is further configured to:
  receive, over the second network interface, a data storage request from a host on the storage area network; and
  perform a data storage operation on the storage array across the storage device interface using the assigned key to encrypt data to be written to the portion of data storage and to decrypt data read from the portion of data storage;
the assigned key is an encrypted assigned key received and stored in encrypted form:
the encrypted assigned key is associated with a first storage device interface module (SDIM) coupled to the storage processing device, the encrypted assigned key having been encrypted with a first key encryption key uniquely associated with the first SDIM, the encrypted assigned key being stored within a first sub-entry of an entry of the table associated with the key identifier, the first sub-entry being indexed by a first SDIM identifier, the first SDIM identifier uniquely identifying the first SDIM;
the controller is further configured to:
  receive, over the first network interface, another encrypted assigned key from the key server, the other encrypted assigned key being associated with a second SDIM coupled to the storage processing device, the first SDIM being distinct from the second SDIM, the other encrypted assigned key having been encrypted with a second key encryption key uniquely associated with the second SDIM, the other encrypted assigned key being an encrypted version of the assigned key; and
  after receiving the other encrypted assigned key from the key server, store the other encrypted assigned key in memory within a second sub-entry of the entry of the key table, the second sub-entry being indexed by a second SDIM identifier, the second SDIM identifier uniquely identifying the second SDIM;
the first SDIM is configured to cryptographically write data received from a host to the portion of data storage using the assigned key; and
the second SDIM is configured to cryptographically write data received from a host to the portion of data storage using the assigned key.

8. A storage processing device as in claim 7 wherein:
the controller is further configured to determine that the assigned key is no longer needed; and
the controller is configured to delete the assigned key from the key table in memory and the cache in the storage device interface in response to determining that the assigned key is no longer needed.

9. A storage processing device as in claim 7 wherein:
the controller is further configured to receive, over the first network from the key server, an instruction to delete the assigned key; and
the controller is configured to delete the assigned key from the key table in memory and the cache in the storage device interface in response to receiving, over the first network from the key server, the instruction to delete the assigned key.

10. A storage processing device as in claim 7 wherein:
the assigned key, when received over the first network interface, is encrypted; and
when storing the key identifier and the assigned key in a cache in the storage device interface, the controller is configured to cause the assigned key to be decrypted and be stored in decrypted form.

* * * * *